United States Patent [19]

Allen et al.

[11] Patent Number: 4,703,329
[45] Date of Patent: Oct. 27, 1987

[54] METHOD AND APPARATUS FOR CONTROLLING SHEET MATERIAL IN AN INK JET PRINTER

[75] Inventors: David Allen; Calvin Winey, both of Chelmsford, Mass.

[73] Assignee: Advanced Color Technology, Inc., Cambridge, Mass.

[21] Appl. No.: 861,591

[22] Filed: May 9, 1986

[51] Int. Cl.$^4$ .................. H04N 1/22; G03G 15/00
[52] U.S. Cl. ........................... 346/24; 346/136; 355/3 DR; 358/304
[58] Field of Search ............. 346/1.1, 24, 136, 137, 346/138, 140; 355/3 DR, 16, 3 DD, 14 D; 358/304; 242/67.3

[56] References Cited

U.S. PATENT DOCUMENTS

| 3,829,208 | 8/1974 | van Meijil et al. | 355/16 X |
| 4,005,257 | 1/1977 | Krallinger et al. | 358/304 X |
| 4,122,497 | 10/1978 | Suzuki et al. | 346/24 X |

OTHER PUBLICATIONS

Slaughter, G. T., "Ink Jet Printer/Copier", *IBM Technical Disclosure Bulletin*, vol. 21, No. 2, Jul. 1978, pp. 698–699.

Primary Examiner—Clifford C. Shaw
Assistant Examiner—Linda M. Peco
Attorney, Agent, or Firm—E. T. Barrett

[57] ABSTRACT

An ink jet printer having an imaging drum with a supply of paper within the drum. The paper is transported by rollers mounted on the imaging drum that are controlled by the transverse position of a cutter mechanism that cuts off the imaged paper. The paper passes from the supply spool in the imaging drum through a longitudinal slot in the drum to the outside, around the exterior of the drum, where it is held in place during the imaging process, and then ejected from the drum to the desired length and cut off. While the imaged sheet is being ejected from the drum, the next length of paper is drawn from the drum and around the outside of the drum in position for the next imaging operation. The length of paper that remains projecting from the drum after the imaged paper has been cut off is then withdrawn into the interior of the drum through the longitudinal opening in the drum surface until only a short stub, which will not interfere with the subsequent imaging operation, remains protruding from the drum. After each imaging operation, the cutter mechanism provides mechanical control of the paper handling drive assembly for the ejection, withdrawal and tensioning of the paper.

11 Claims, 20 Drawing Figures

METHOD AND APPARATUS FOR CONTROLLING SHEET MATERIAL IN AN INK JET PRINTER

BACKGROUND OF THE INVENTION

1. Field of the Invention

This invention relates to ink jet printers, and more particularly to an improved method and apparatus for handling sheet materials in an ink jet printer in which the sheet material is stored within an imaging drum and is arranged to feed to the outer surface of the drum where writing or imaging operations occur.

2. Brief Description of the Prior Art

In ink jet printers of the type in which paper, or other sheet material, is fed from a continuous roll into the reproducing equipment and is cut into individual sheets after the imaging operation, it is important to synchronize the various steps in the operation and to provide a reliable and economical control system. Complex control systems have been proposed for this function, but none have combined the properties of reliability, simplicity and low production cost.

Mechanisms for storing sheet materials within an imaging drum are shown in the following U.S. Pat. Nos.: 866,624 to Collier; 4,239,375 to Eisben et al.; 4,231,652 to Moser et al., 4,102,570 to Shimoda; 4,097,138 to Kingsley; 4,068,992 to Buchel, 626,556 to Nolan; and 3,829,208 to van Meljel. None of these patents shows the details of sequential operations for handling sheet materials in which the sheet materials are to be ejected from the drum rather than returned to its interior. The van Meljel patent is the only one that shows any arrangement for ejecting the medium from the drum for disposal or other use.

SUMMARY OF THE INVENTION

In accordance with the present invention, the sequential operations are controlled by multiple positions of a drive mechanism for handling the sheet materials. A cutter mechanism is provided to shear the imaged sheet from the supply roll and advantage is taken of the same cutter mechanism to control the sequential operations through spatial displacement of the drive mechanism.

In the embodiment described here, a roll of paper is stored on a supply spool mounted within an imaging drum. The paper is transported by rollers mounted on the imaging drum that are controlled by the transverse position of the cutter mechanism. The paper passes from the supply spool in the imaging drum through a longitudinal slot in the drum to the outside, around the exterior of the drum, where it is held in place during the imaging process, and then ejected from the drum to the desired length and cut off. While the imaged sheet is being ejected from the drum, the next length of paper is drawn from the interior of the drum and around the outside of the drum in position for the next imaging operation. The length of paper that remains projecting from the drum after the imaged paper has been cut off is then withdrawn into the interior of the drum through the longitudinal opening in the drum surface until only a short stub, which will not interfere with the subsequent imaging operation, remains protruding from the drum.

When the imaging drum is stopped, the drive rollers carried by the drum are connected to a drive mechanism by moving the cutter mechanism to a first control position in which the imaged paper is ejected. The paper is then sheared at a point spaced from the imaging drum and the remaining length of paper is withdrawn toward the drum. When the cutter mechanism is moved to a second control position, the paper is tensioned around the drum. In a third position of the cutter mechanism, the paper drive mechanism is disconnected from the drum permitting free rotation of the imaging drum. After each imaging operation the cutter mechanism provides mechanical control of the paper handling drive assembly for the ejection, withdrawal and tensioning of the paper.

DESCRIPTION OF THE PREFERRED EMBODIMENT

Figure 1:
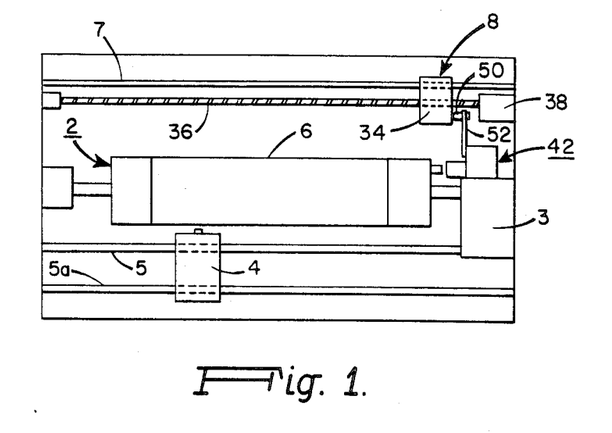
FIG. 1 is a diagrammatic top view of an ink jet printer embodying the invention.

As shown in FIG. 1, the ink jet printer includes a rotatable drum, generally indicated at 2, that is driven by a stepping motor 3. An ink jet printing head assembly 4 is mounted for longitudinal movement along tracks 5 and 5a. The imaging paper or other sheet material 6 envelopes the outer surface of the drum 2 during the imaging process and, at its conclusion, is ejected across a cutter bar 7 where it is sheared by a cutter mechanism, generally indicated at 8. The term "sheet material" as used in this application includes the various flexible media on which images can be recorded, such as paper, transparencies and photographic materials, which are supplied in long lengths. While the drum 2 rotates, the print head 4 moves longitudinally along the drum 2 tracing a spiral path on the paper 6 to produce the desired image. As the completed image is ejected, a length of unused paper is simultaneously drawn from the interior of the drum 2 and positioned around the outside of the drum.

The Paper Drive and Control Mechanism

Figure 2:
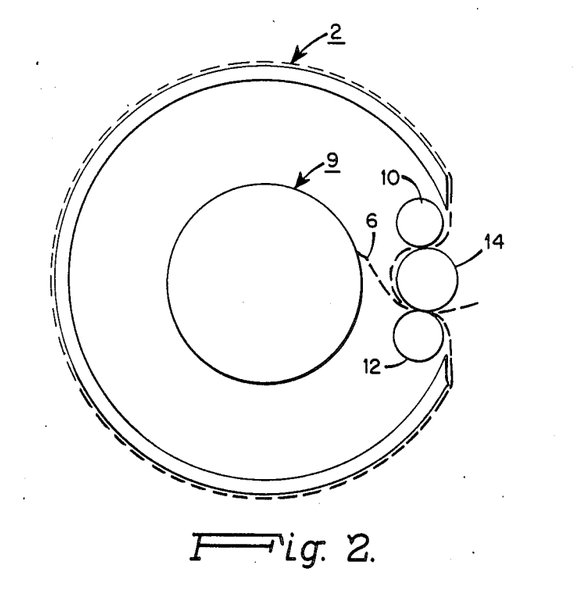
FIG. 2 is a diagrammatic illustration of the paper drive rollers.
Figure 3:
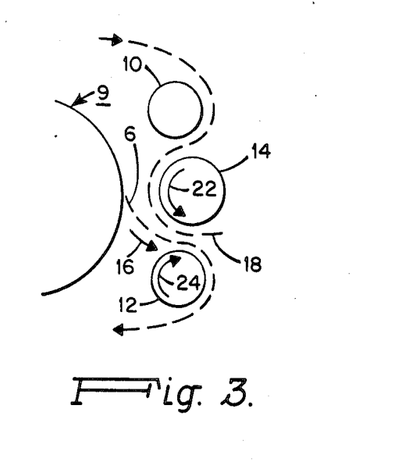
FIGS. 3 and 4 are diagrammatic views with the paper drive rollers spaced apart for purposes of explanation.
Figure 4:
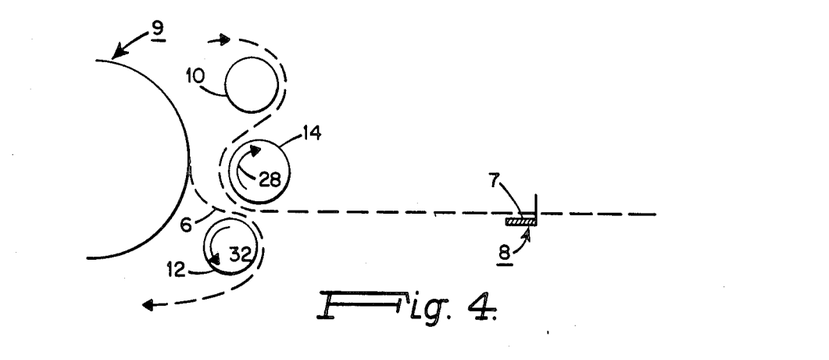

As illustrated diagrammatically in FIGS. 2, 3 and 4, the rotatable drum 2 supports within it a rotatably mounted spool, generally indicated at 9, that carries a roll of paper 6. The drum 2 also carries three rollers: an idler roller 10, a tension roller 12, and a drive roller 14. The path of the paper around and between these rollers is illustrated in FIGS. 3 and 4 where the rollers 10, 12 and 14 have been spaced apart only for the purpose of illustration.

The paper 6 from the spool 9 passes between the drive roller 14 and the tension roller 12, as illustrated by the arrow 16, partially around roller 12 and then around the outer circumference of the drum 2. After passing around the surface of the drum 2, the paper passes between the idler roller 10 and the drive roller 14, partially around the inner surface of the roller 14 and then between the rollers 12 and 14 where one surface of the paper engages the roller 14 and the other surface engages the length of paper already between the same pair of rollers. A short stub 18 (FIG. 3) of paper extends from between the rollers 12 and 14.

In that condition, the paper 6 is tensioned around the drum 2 and the rollers 12 and 14 are locked in position. The imaging process is then performed to produce an image on the surface of the paper 6 on the drum. When the imaging is completed, the drum is stopped at a predetermined rotary position and a drive mechanism, to be described later, is connected to the roller 12. To eject the imaged paper, the rollers 12 and 14 are driven in the directions indicated by the arrows 22 and 24 in FIG. 3. This action causes additional paper to be drawn from the spool 9 and travel around the drum while the rollers 12 and 14 eject the imaged paper. When a sufficient length of paper has been ejected, the paper extends to the cutter mechanism 8 in FIG. 4, which may be located some distance from the drum 2. The length of the paper ejected may be measured by any appropriate mechanism such as by the rotation of a disk 25 (FIG. 8) that is secured to and rotates with the idler roller 10. The disk 25 has radial non-reflecting stripes that are detected and counted by an infrared detector 27. The paper is then sheared by the cutter mechanism 8 to separate the imaged portion. At this time, a length of paper extends from the drum 2 to the cutter bar 7. The drive mechanism is arranged to drive the rollers 12 and 14 in the directions indicated by the arrows 28 and 32 in FIG. 4. This action draws the paper back between the rollers 12 and 14, partially around the surface of roller 14, between roller 14 and the idler roller 10, around the outer surface of the drum 2, and again between the rollers 12 and 14 into the interior of the drum. This motion is continued until the paper is withdrawn to again leave the short stub 18 projecting from between rollers 12 and 14 as measured by reverse rotation of the disk 25.

During the imaging process, it is important that the paper 6 be in close contact with the surface of the drum 2. This is achieved by locking the roller 14 and driving the roller 12 in the direction indicated by the arrow 32 in FIG. 4. The driving surfaces of the rollers 12 and 14, which may be rubber, have relatively high friction so that when the roller 12 is driven in the reverse direction indicated by arrow 32, it tensions the paper around the drum by returning a short length of paper into the drum while the paper at the other end of the drum surface is restrained because of the surface friction of the locked drive roller 14. During this motion, the stub 18 is prevented from being withdrawn into the drum because the friction between the surface of the roller 14, which is locked, and the paper is substantially greater than the friction between the two adjacent surfaces of the paper. During and subsequent to this tensioning process, the roller 12 is driven through a one-way clutch, to be described later, which permits rotation of the roller 12 only in the direction of the arrow 32 relative to the gear that drives this roller. Thus, when the tensioning action is complete and the drive is released from the roller 12, the paper remains under tension. The tensioning process is not controlled by the length of the paper withdrawn, but instead the tensioning roller 12 is merely allowed to operate for some prefixed period of time, for example, five seconds. Alternatively, a tension responsive switch can be used to disconnect the drive.

When the tensioning process has been completed, the drive mechanism is disconnected from the drum which is then rotated to produce the next imaging sequence. This arrangement permits an automatic continuing sequence of imaging processes while eliminating many of the problems of handling the paper and at the same time reducing the cost and simplifying the paper-handling equipment.

Figure 5:
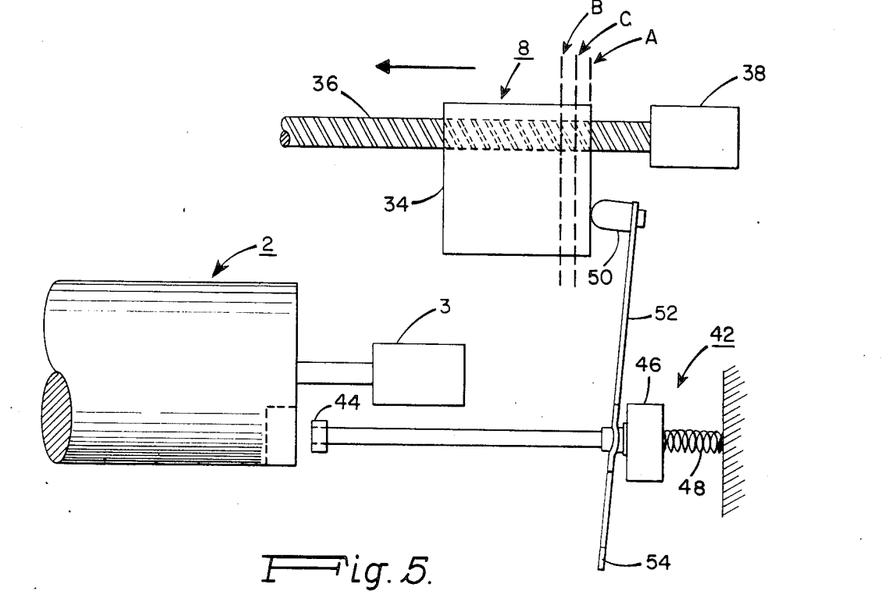
FIGS. 5, 6 and 7 are diagrammatic views illustrating the control of the paper drive mechanism by the cutter assembly.
Figure 6:
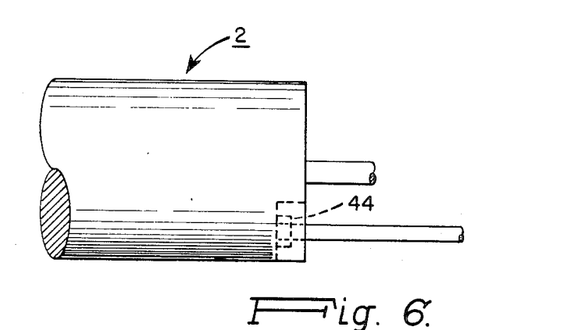
Figure 7:
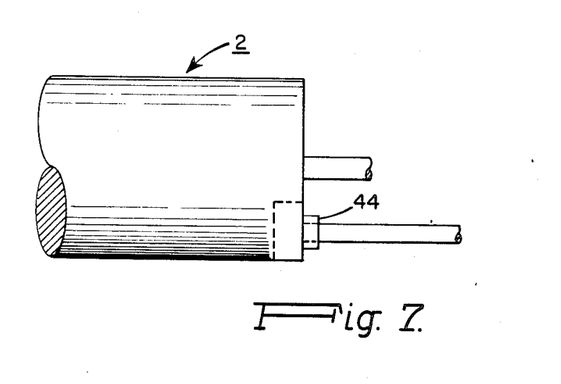

FIGS. 5, 6 and 7 illustrate diagrammatically the control system for the paper drive rollers. The cutter mechanism 8, which will be described in detail later, is carried by a housing 34 that is driven transversely by a screw 36, or some other means, to shear the paper 6 after each imaging process. Advantage is taken of the position of this housing 34 to control the paper transport and thus simplify and lower the cost of the control system. A drive assembly, generally indicated at 42, to be described in detail later, drives the roller 12 through a coupling sleeve 44. The sleeve 44 is connected to a motor 46, which forms part of the the assembly 42 that is biased toward the paper drum 2 by a spring 48. The position of this drive assembly controls the three operating modes: the rest mode during which the drum 2 is free to rotate; the drive mode for ejecting and retracting the paper 6; and the tensioning mode when the paper is tensioned around the drum 2.

FIG. 5 represents the condition when fresh paper has been positioned on the drum 2 and another image is to be created. The housing 34, driven by the motor 38, has forced a bumper 50, which is carried by a lever 52, supported about a hinge 54, to its far right position "A", as viewed in FIG. 5, against the force of the spring 48. In this position, the tip of the bumper 50 lies in the plane indicated by the broken line A and the drive sleeve 44 is disconnected and spaced from the drum 2.

The drive motor 3 is then energized by a central processor unit, to be described later, to cause the drum 2 to rotate. At the same time, the mechanism (not shown) for moving the head and controlling the ink jets in accordance with the desired program, and which may be of conventional construction, are also activated by the central processor unit. The drum continues to rotate until the printing head has completed the image, which is determined in accordance with the particular imaging program. The rotation of the drum 2 is then stopped and the drum is positioned for coupling to the sleeve 44 of the roller drive assembly 42. The motor 38 is then energized to drive the screw 36, or alternative drive, and cause the housing 34 to move to position "B" in which the tip of the bumper 50 lies in the plane indicated by the broken line B in FIG. 5. In this position, the drive sleeve 44 is fully engaged with the drum 2, as indicated in FIG. 6, and both rollers 12 and 14 are driven by the motor 46 in the directions of the arrows 22 and 24 in FIG. 3. The imaged paper is then ejected from the drum 2 while the surface of the drum 2 is replenished with fresh paper. When a predetermined length of paper has been ejected, the roller drive motor 46 is then deenergized and the cutter drive motor 38 is activated to shear the imaged paper.

The motor 38 is then reversed, returning the housing 58 to position "B", placing the tip of the bumper 56 again in the plane indicated at B. The motor 46 is then energized to drive the rollers 12 and 14 in the reverse direction to withdraw the length of paper between the drum 2 and the cutter bar 7 into the drum until only the stub 18 is left protruding from between the rollers 12 and 14.

The motor 38 is then activated again to move the housing to its "C" position in which the tip of the bumper 50 lies in the plane indicated by the broken line C in FIG. 5. In this intermediate position, indicated by FIG. 7, the roller 14 is locked from rotation, as previously described, and the roller 12 is driven by motor 46 in the direction of the arrow 32 to tension the paper around the drum 2. The motor 46 remains energized for approximately 5 seconds or for a time period sufficient to insure tensioning of the paper.

When the paper has been tensioned around the drum, the printer is ready for the next imaging operation. The housing 34 is moved to its "A" position and the entire process is repeated. Conventional control circuitry, not shown here, is used to operate the cutter mechanism 8 and the necessary drive units.

FIGS. 8, 9 and 12-17 illustrate the mechanical details of the paper drive. During the rest mode, the drive assembly 42 is disconnected from the roller 12 by moving the drive assembly to its position farthest removed from the drum 2 leaving the drum free for rotation. This is illustrated by the diagrammatic representation of FIG. 9 in which the coupling is viewed from the front of the printer. In the driving mode, the drive assembly is moved to its position nearest the drum 2 and is arranged to drive rollers 12 and 14, mounted on shafts 56 and 58 respectively, (FIG. 8) by means of a spur gear 60, carried by the shaft 56, and a similar gear 62 carried by the shaft 58 of the drive roller 14.

In the tensioning mode, the drive assembly 42 is positioned at an intermediate station where it is arranged to drive the roller 12 while the roller 14 is locked against reverse rotation by the drive assembly.

When the drum 2 is rotating, as during the imaging mode, the roller 12 is disconnected from the drive assembly 42 by the lever 52 (FIGS. 12 and 15-17) which is hinged at 54 on one end and carries the bumper 50 on the opposite end. The position of the lever 52 is controlled by the position of the housing 34 that carries the cutter mechanism 8, to be described later.

Figure 12:
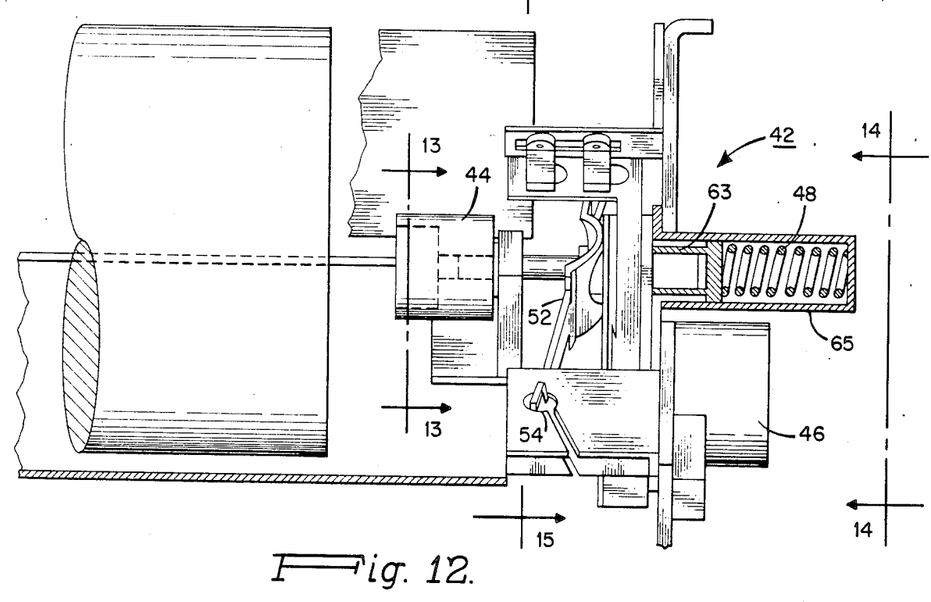
FIG. 12 is a partial sectional view showing the driving and control arrangement for the paper handling mechanism as viewed from the rear of the printer.
Figure 13:
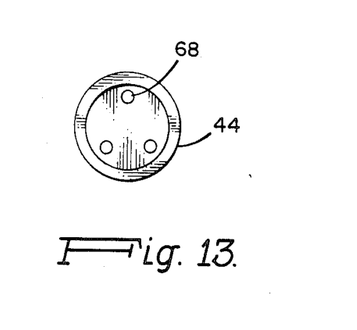
FIG. 13 is a partial view along line 13—13 of FIG. 12.
Figure 14:
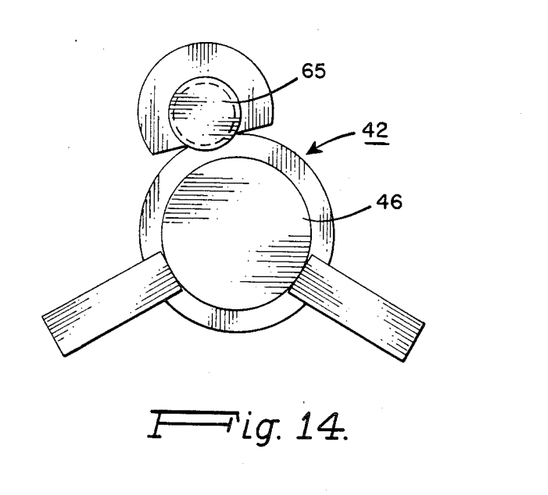
FIG. 14 is an end view along line 14—14 of FIG. 12.
Figures 15, 16:
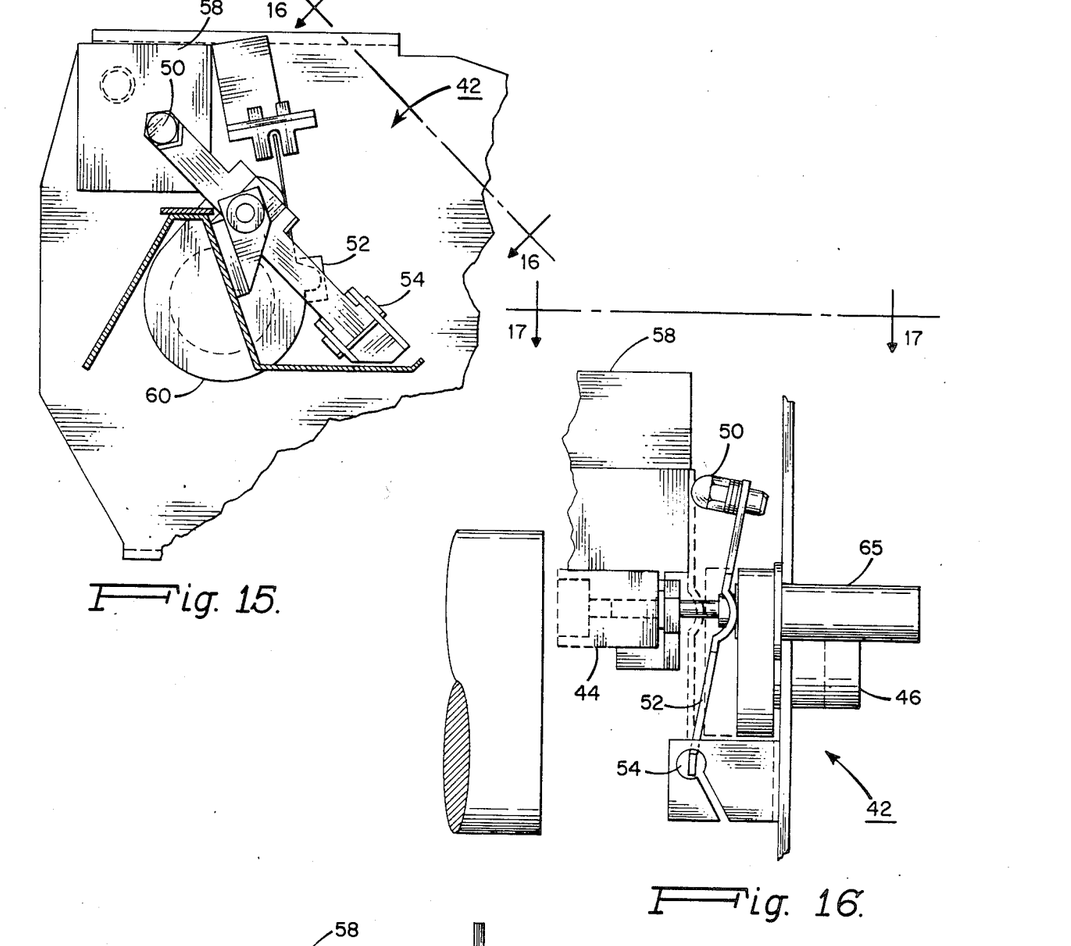
FIG. 15 is a view along line 15—15 of FIG. 12.
FIG. 16 is a view along line 16—16 of FIG. 15.
Figure 17:
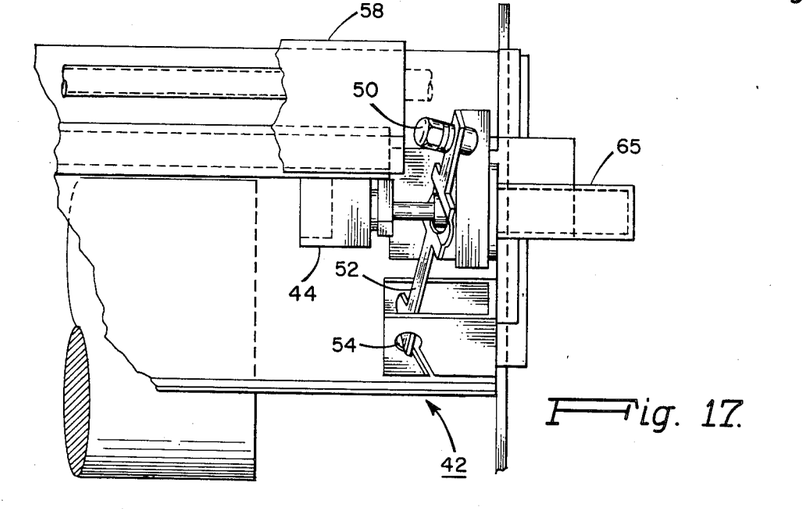
FIG. 17 is a top view of the assembly along line 17—17 of FIG. 16.
Figure 20:
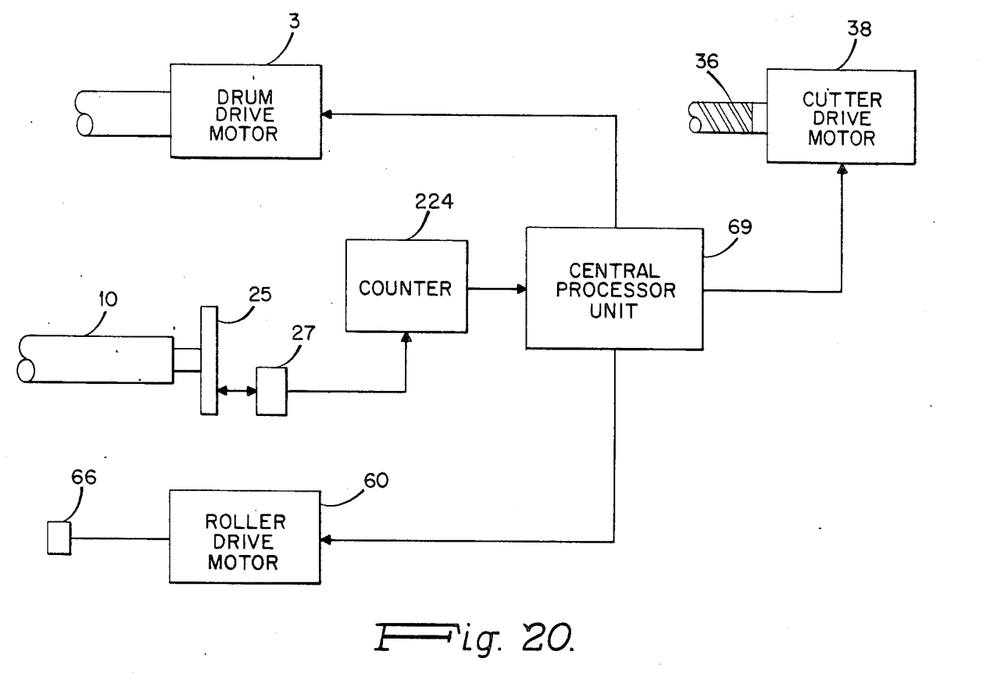
FIG. 20 is a block diagram illustrating the operation of the central processor unit.

When the printer is in the imaging mode and the drum 2 is rotating, the lever 52 retains the motor 46 and its associated assembly in its rest position, far right as viewed in FIGS. 12 and 16. In this rest position, a plunger 63, which engages the lever 52, maintains the spring 48 under maximum compression within a stationary mounting case 65. The drive sleeve 44 connected to the motor 46, and which contains three splines 68 (FIGS. 9 and 13) positioned circumferentially 120° apart within the sleeve 44, is spaced from the drum 2 leaving it free for rotation. The drum 2 is driven by the direct drive stepping motor 3, as illustrated by FIG. 20, which by means of a central processor control unit 69 stops the drum 2 at the end of the imaging cycle. The drum is then caused to rotate slowly until a radial mark 71, carried by a disk 70, (FIG. 8) which rotates with the drum 2, indicates through an infrared detector 73 that the drum 2 is in the correct position for coupling the drive 42 to the roller 12.

Figures 8, 9:
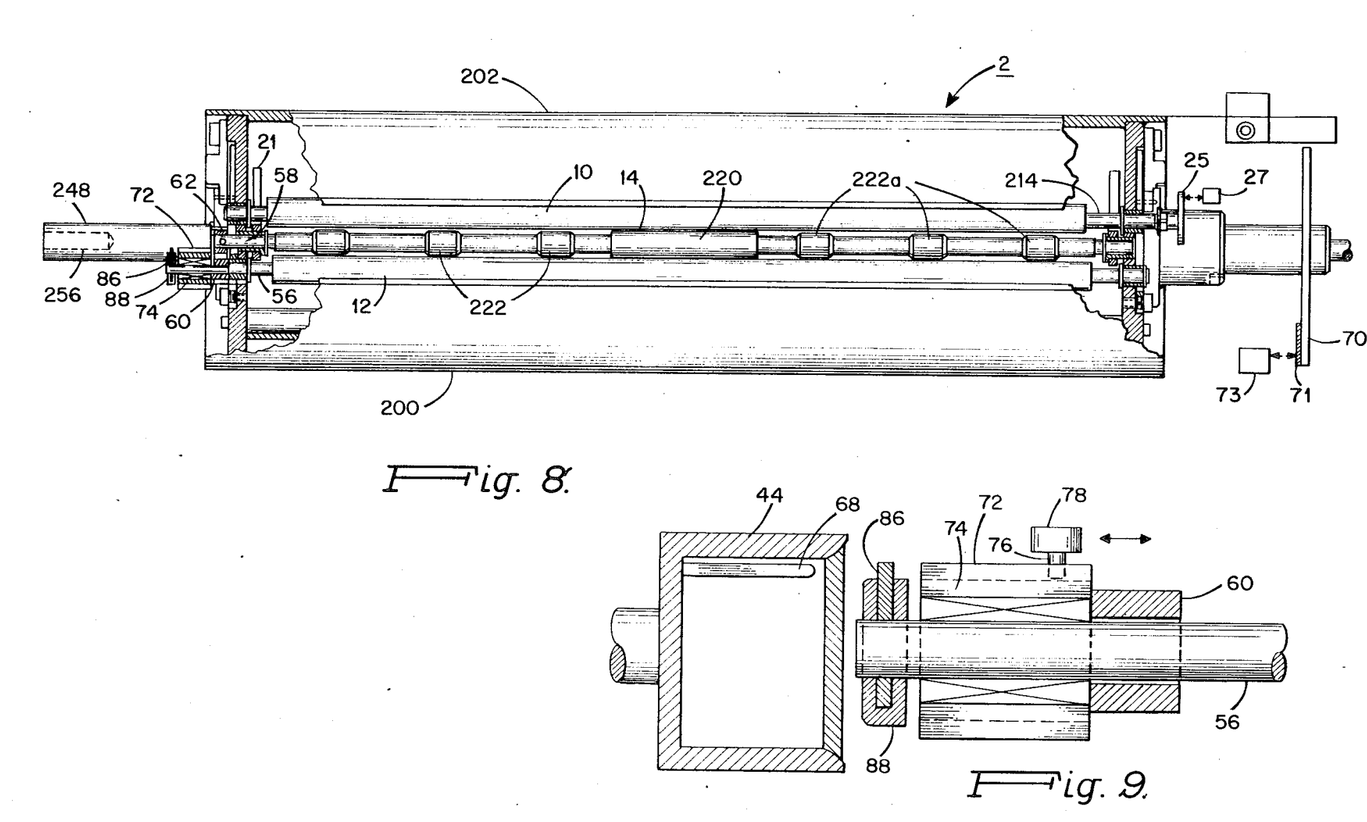
FIG. 8 is an elevational view of the imaging drum, partially cut away to show the interior construction.
FIG. 9 is an enlarged diagrammatic sectional view of the drive coupling arrangement for illustrating its operation.

When the imaging operation is completed and the drum 2 has been stopped in its drive position, the housing 34 is moved to the drive position that causes the drive motor assembly 42 to be coupled to the roller 12 through the sleeve 44 to eject the imaged paper 6. In this position, the splines 68 engage the teeth of a spur gear 72 (FIGS. 8 and 9) that extends within the sleeve 44. The spur gear 60 is secured to gear 72 but is not secured to the shaft 56 other than through the gear 72. As best shown in FIG. 9, a collar 88, that forms the end of the mechanism by which rollers 12 and 14 are driven, and the interior of the sleeve 44 are tapered so that the drive sleeve 44 is brought into engagement with the gear 72 in spite of slight variations in the rotary position of the drum 2. The gear 72 is secured to the shaft 56 that carries the roller 12 through a conventional one-way clutch, diagrammatically illustrated at 74, that permits rotation of the shaft 56 in the direction of the arrow 32 of FIG. 4 relative to the gear 72 but prevents relative rotation in the opposite direction.

Figure 10:
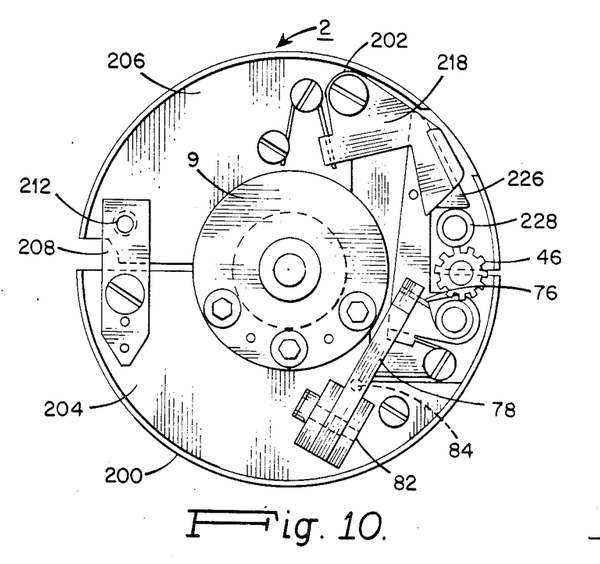
FIG. 10 is an end view of the imaging drum.

The gear 72 is normally locked from rotation by a pin 76 (FIGS. 9 and 10) carried in the end of an arm 78 and which extends into the space between adjacent teeth on the gear 72. The arm 78 is hinged at 82 and is biased toward the locking position by a coil spring 84 positioned between the the end of the drum 2 and the arm 78. In the position when the gear 72 is engaged by the drive sleeve 44, the end of the sleeve 44 abuts the arm 78 and moves it toward the right, as viewed in FIG. 9, so that the pin 76 no longer engages the gear 72.

When the paper has been ejected to the desired length, as determined by the counter disk 25 on the idler roller, the drive motor 46 is stopped which prevents movement of the rollers 12 and 14 while the paper is sheared by the cutter mechanism 8.

After the paper has been sheared, the motor assembly 42, while in the drive position, is driven in the reverse direction, by reversing the motor 46, to withdraw the paper, under the control of the counter disk 25, until only the short stub 18 projects from between the rollers 12 and 14. The housing 34 is then moved, against the force of the spring 48 (FIGS. 5 and 12), to move the lever 52 and the motor assembly 42 to its intermediate or tensioning position. In this position, the end of the coupling sleeve 44, which abuts the lever 78, has moved away from the drum 2 allowing the pin 76 (FIGS. 9 and 10), to lock the roller 14 by engaging the teeth of the gear 72, while the roller 12 is driven in the direction of the arrow 32 (FIG. 4). This is accomplished by a drive pin 86 (FIGS. 8 and 9) that extends through the collar 88 in the end of the shaft 56 of the roller 12. One of the splines 68 in the drive sleeve 44 engages the drive pin 86, but not the teeth of gear 72, while the gear 72, and thereby the gears 60 and 62 and the roller 14, are locked by the locking pin 76. In this state, while the gear 72 is locked, shaft 56 is free to rotate in the direction of arrow 32 of FIG. 4 because of the one-way clutch 74.

The Paper Shear Mechanism

Figure 18:
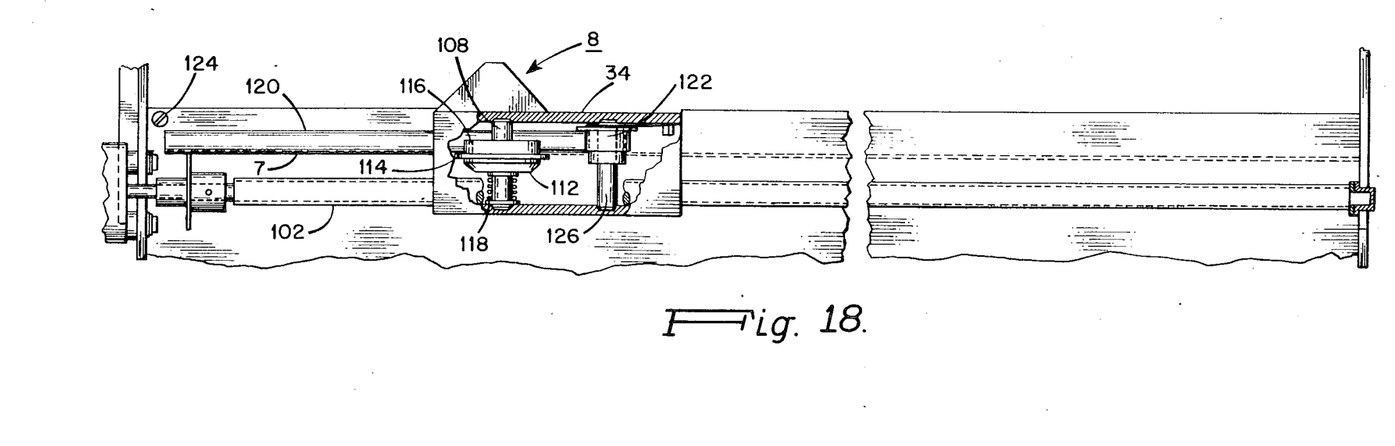
FIG. 18 is a front view, partially cut away, of the mechanism for shearing the paper after each imaging operation.
Figure 19:
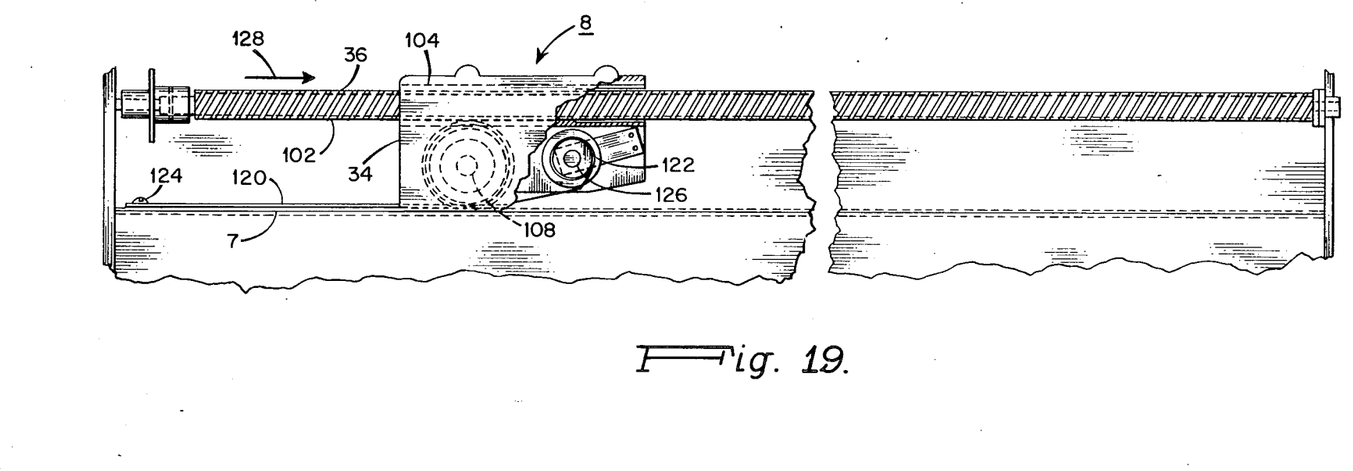
FIG. 19 is a top view, partially cut away, of the cutting mechanism of FIG. 18.

The paper shear mechanism 8 is shown in more detail in FIGS. 18 and 19. It is driven horizontally by the screw 36, or some other means, that engages a plastic drive nut 104 secured within the cutter housing 34. A shaft 108 extends between opposite sides of the housing 34 and carries a plastic support washer 112, a cutter wheel 114 and a resilient drive wheel 116 that is secured to the cutter wheel 114. The drive wheel 116 is maintained under pressure against the top surface of the cutter bar 7. The cutter wheel 114 is maintained in pressure engagement with a side edge of the cutter bar 7 by a coil spring 118. As the shear mechanism 8 is moved longitudinally by rotation of the screw 36, or engagement of an alternate mechanism, the drive wheel 116 causes the cutter wheel 114 to rotate and shear the paper 6.

To maintain the paper in firm contact with the cutter bar 7 and prevent wrinkling, a length of a constant force spring 120 is arranged to overlay the paper during the shearing operation. One end of the spring is secured to the upper surface of the cutter bar 7, as by a screw 124 (FIG. 19), and the other end portion forms a coil 122 that is rotatably mounted on a support 126 carried by the housing 34. As the cutter assembly 8 is moved in the direction of the arrow 128 to shear the paper, the spring 120 uncoils to lay on the surface of the paper. The spring is pressed against the paper by the force of the drive wheel 116 so that the paper is prevented from moving laterally ahead of the cutter assembly. When the shear is completed and the cutter assembly returns to its home position, the flat spring 120 returns to the coil 122.

The Imaging Drum

Figure 11:
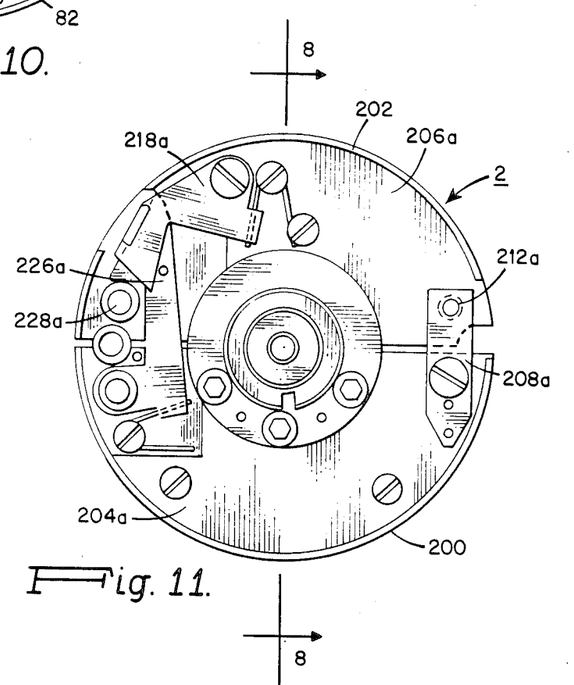
FIG. 11 is a view of the opposite end of the drum.

Access to the interior of the drum 2 may be by any appropriate means, such as by removing one end of the drum. In this example, access is provided by forming the drum of two hinged sections. The drum 2 (FIGS. 8, 10 and 11) is formed of a cylindrical shell of two halves: a lower section 200 and a cover section 202. The lower section 200 of the drum 2 is provided at its ends with semicircular end plates 204 and 204a and the cover section 202 is provided with similar end plates 206 and 206a. The end plate 206 is hinged to the end plate 204 by an arm 208 secured to the plate 204 which carries a hinge pin 212. At the opposite end the cover section is secured to the lower section by a similar arrangement of arm 208a and hinge pin 212a. The two sections are separated by a longitudinal slot by the distance necessary to permit the hinge action.

The idler roller 10 comprises a shaft 214 covered by a rubber sleeve and is mounted for free rotation in the end plates 206 and 206a of the cover section 202. The covering on shaft 214 may be any resilient material having a relatively high coefficient of friction to insure that the roller 10 will be rotated by any movement of the paper between the roller 10 and the drive roller 14. The rubber covering extends substantially the full length of the shaft 214 and is of uniform diameter.

The shaft 58 of the drive roller 14 is rotatably supported in any desired manner on the two end plates 206 and 206a of the cover drum section 202. Only the center portion of the shaft 48 is covered with a resilient sleeve 220, for example about two inches in length, that engages the rollers 10 and 12 when the cover section 202 is in its closed position.

The shaft 42 of the tensioning roller 12 is mounted in the end plates 204 and 204a of the lower drum section 200. This roller is similar in construction to the idler roller 10 and carries a resilient sleeve that extends most of the distance between the end plates 204 and 204a. The drum is maintained in its closed position by a pair of latches 226 and 226a.

When the latches 226 and 226a are manually released, the cover drum section 202 can be rotated about the hinge pins 212 and 212a to open the drum and permit access to the interior. The paper supply spool 9 (FIGS. 1 and 2) is mounted by conventional means for rotation within the drum 2.

We claim:
1. In an ink jet printer of the type having
an imaging drum,
a supply of sheet material within said drum, and
imaging means for producing an image on said sheet material while positioned on said drum,
apparatus for controlling the transport of said sheet material comprising
drive means for said sheet material having
a first spatial position in which said drive means is coupled to said drum and transports said sheet material in a first direction, and
a second spatial position in which said drive means is disconnected from said drum,
a cutter mechanism for shearing said sheet material,
and means controlled by said cutter mechanism for moving said drive means between said first and second positions.
2. Apparatus as claimed in claim 1 including
second drive means for moving said cutter mechanism transversely across said sheet material thereby to sever said sheet material.
3. Apparatus as claimed in claim 2 wherein
said means controlled by said cutter mechansim includes a lever, and
spring means biasing said lever into engagement with said cutter mechanism.
4. Apparatus as claimed in claim 1 wherein
said drive means for said sheet material includes
first and second rollers carried by said drum and engaging said sheet material, and
a coupling element, and wherein
when said drive means is in said first position said coupling element engages said rollers and when in said second position is disengaged from said rollers.
5. Apparatus as claimed in claim 4 wherein
said drive means has a third spatial position in which said coupling element engages said first roller, and said second roller is locked from rotation.
6. In an ink jet printer of the type having
an imaging drum,
a supply of sheet material within said drum, and
imaging means for producing an image on said sheet material while positioned on said drum,
apparatus for controlling the transport of said sheet material including
a cutter mechanism having a movable carriage,
first drive means for moving said carriage across said sheet material thereby to sever said sheet material,
second drive means arranged to transport said sheet material from within said drum and position it on the outer surface therof, and
mechanical control means responsive to the position of said carriage for actuating said second drive means.
7. Apparatus as claimed in claim 6 wherein
said cutter mechanism is spaced from said drum, and
said second drive means has
a first operating condition by which said sheet material is transported from within said drum, around the outer surface thereof and beyond said cutter mechanism, and a second operating condition by which said sheet material is withdrawn from said cutter mechanism toward said drum, and said cutter mechanism has a first position actuating said second drive means into its first operating condition, and a second position actuating said second drive means into its second operating condition.

8. Apparatus as claimed in claim 7 wherein said second drive means has a third operating condition in which said sheet material is secured at one circumferential point on said drum and driven at another point to tension said sheet material on said drum, and said carriage has a third position actuating said second drive means to its third operating condition.

9. In an ink jet printer of the type having an imaging drum, a supply of sheet material within said drum, imaging means producing an image on said sheet material while positioned on the outer surface thereof, the method of transporting and shearing said sheet material comprising the steps of providing a cutter mechanism for shearing said sheet material, extending said sheet material from said drum, actuating said cutter mechanism to shear said sheet material, positioning said cutter mechanism in a first predetermined control position, actuating said sheet material drive means in response to the positioning of said cutter mechanism in said first position to engage said drum and withdraw said sheet toward said drum, positioning said cutter mechanism in a second predetermined control position, and disengaging said drive means from said drum in response to the positioning of said cutter mechanism in said second position thereby to permit rotation of said drum.

10. The method as claimed in claim 9 wherein said sheet material is paper, and including the step of moving said cutter mechanism transversely across said sheet thereby to sever the imaged portion thereof from said supply.

11. In an ink jet printer of the type having an imaging drum, a length of sheet material around the exterior of said drum, and imaging means for producing an image on said sheet material while positioned on the outer surface of said drum, the method of transporting and shearing said sheet material comprising the steps of providing a cutter mechanism for shearing said sheet material, providing a sheet material drive means, positioning said cutter mechanism and said drive means in a first predetermined control position, actuating said drive means in a forward direction while said cutter mechanism is in said first position to move said sheet material away from said drum, actuating said cutter to sever said sheet material, positioning said cutter mechanism and said drive means in said first position, actuating said sheet material drive means in a reverse direction while said cutter mechanism and said drive means are in said first position to withdraw said sheet material toward said drum, positioning said cutter mechanism and said drive means in a second predetermined control position, actuating said drive means while said cutter mechanism and said drive means are in said second position to engage said drum in a second position and tension said sheet material around said drum, and positioning said cutter mechanism and said drive means in a third predetermined control position and thereby disconnect said drive means from said drum.

* * * * *